US006278250B1

(12) United States Patent
Sasaki

(10) Patent No.: US 6,278,250 B1
(45) Date of Patent: Aug. 21, 2001

(54) POWER WINDOW APPARATUS CAPABLE OF OPENING WINDOWS AT OPERATION SIDE BY MANUALLY OPERATING DRIVER SEAT WINDOW OPEN SWITCH OR PASSENGER SEAT WINDOW OPEN SWITCH LOCATED ON DRIVER SEAT WINDOW OPERATION UNIT UPON DETECTION OF FLOODING INSIDE AUTOMOBILE

(75) Inventor: Akira Sasaki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/514,690

(22) Filed: Feb. 28, 2000

(30) Foreign Application Priority Data

Mar. 1, 1999 (JP) ................................................ 11-052689

(51) Int. Cl.[7] ..................................................... B60R 16/02
(52) U.S. Cl. ........................... 318/283; 318/468; 318/483
(58) Field of Search .................................... 318/264, 265, 318/266, 267, 280, 283, 284, 286, 466, 467, 468, 483

(56) References Cited

U.S. PATENT DOCUMENTS 5,121,038 * 6/1992 Yamamura et al. ................. 318/280
5,925,997 * 7/1999 Yamaoka .............................. 318/483
5,994,797 * 11/1999 Yamaoka .............................. 307/125
6,060,794 * 5/2000 Takagi et al. ........................ 307/125
6,072,290 * 6/2000 Takagi et al. ........................ 318/283
6,081,085 * 6/2000 Ohashi et al. ....................... 318/283
6,111,373 * 8/2000 Ohashi ................................. 318/265
6,201,363 * 3/2001 Miyazawa ............................ 318/283

FOREIGN PATENT DOCUMENTS 7-230736 8/1995 (JP) .
8-203399 8/1996 (JP) .

* cited by examiner

*Primary Examiner*—Bentsu Ro
(74) *Attorney, Agent, or Firm*—Brinks Hofer Gilson & Lione

(57) ABSTRACT

A power window apparatus capable of opening a window or windows of a submerged automobile by manually operating a driver seat window open switch or a passenger seat window open switch both located on a driver seat window operation unit. The driver seat window operation unit and passenger seat window operation units have each a window close switch, a window open switch, a window open/close motor, and a motor drive controller. The driver seat window operation unit has a submersion detector for generating a submersion detection signal, a motor drive controller incorporating a control driver for opening windows when the driver manually operates corresponding window open switches, and connection lines for connecting normally close contacts of passenger seat window open switches located on the driver seat window operation unit with the normally close contacts of the window open switches located on the passenger seat window operation units.

2 Claims, 3 Drawing Sheets

POWER WINDOW APPARATUS CAPABLE OF OPENING WINDOWS AT OPERATION SIDE BY MANUALLY OPERATING DRIVER SEAT WINDOW OPEN SWITCH OR PASSENGER SEAT WINDOW OPEN SWITCH LOCATED ON DRIVER SEAT WINDOW OPERATION UNIT UPON DETECTION OF FLOODING INSIDE AUTOMOBILE

BACKGROUND OF THE INVENTION

1. Field of the Invention

The present invention relates generally to a power window apparatus for use on an automobile and, more particularly, to a power window apparatus for use on an automobile for opening its windows upon operation by a passenger of a nearby window open switch to escape from the automobile when the automobile has submerged in water for some reason and is flooded inside.

2. Description of Related Art

Generally, a power window apparatus is made up of a driver seat window operating unit, a front passenger seat window operating unit, a rear right side window operating unit, and a rear left side window operating unit.

In this case, the driver seat window operation unit has at least driver seat window open and close switches, front passenger seat window open and close switches, rear right seat window open and close switches, rear left seat open and close switches, a driver seat window open/close motor, a motor driver composed of a relay for example for rotationally driving the motor so as to open or close the driver seat window according to the operation of the driver seat window open or close switch, and a controller (or a CPU) for controlling the entire driver seat window operation unit.

The front passenger seat window operation unit, the rear right seat window operation unit, and the rear left seat window operation unit have each at least window open and close switches, a window open/close motor, a motor driver for rotationally driving the motor so as to open or close the window according to the operation of the window open/close switch, and a controller (or a CPU) for controlling the entire window operation unit.

In the above-mentioned known power window apparatus, when the driver manually operates the driver seat window open or close switch located on the driver seat window operation unit, the driver seat window is opened or closed; when the driver manually operates the front passenger seat window open or close switch located on the driver seat window operation unit, the front passenger seat window is opened or closed; when the driver manually operates the rear right seat window open or close switch in the driver seat window operation unit, the rear right seat window is opened or closed; and when the driver manually operates the rear left seat window open or close switch in the driver seat window operation unit, the rear left seat window is opened or closed. When the front passenger manually operates the window open or close switch in the front passenger seat window operation unit, the front passenger seat window is opened or closed. When the rear right passenger manually operates the window open or close switch in the rear right seat window operation unit, the rear right seat window is opened or closed. When the rear left passenger manually operates the window open or close switch in the rear left seat window operation unit, the rear left seat window is opened or closed.

However, if an automobile equipped with such a power window apparatus has been submerged in water for some reason and the water gets inside the automobile, the water also gets in door pockets, affecting the driver seat window operation unit, the front passenger seat window operation unit, and rear right and left seat window operation units. In these window operation units, the water gets inside the window open and close switches more often than other components of the window operation units because the manual operation section of these switches are exposed outside. If the water gets inside the window open switch or the window close switch, getting eventually between the switch contacts, the water provides a low resistor between the contacts, thereby preventing the normal open/close state of the contacts.

If, in such a state, the driver or a passenger operates the window open switch in the corresponding window operation unit, the window may be not opened, making it difficult for them to escape from the flooded automobile.

SUMMARY OF THE INVENTION

To overcome the above-mentioned problem, the applicant hereof proposed a waterproof power window apparatus for use on an automobile, the apparatus having a submergence detector located on a driver seat window operation unit and/or the window operating units of passenger seat windows, the submergence detector detecting the flooding inside the automobile.

When the automobile is flooded inside and any of the window operation units each housed in its door pocket is affected by the flooding, the submergence detector in that window operation unit detects the flooding and outputs a submersion detection signal. Receiving this signal, the CPU of that window operation unit controls a motor driver in that window operation unit so as to rotationally drive the motor of that window operation unit when the window open switch of that window operation unit is manually operated, thereby opening the window. Within a certain period after starting of the flooding, the driver or a passenger can open the corresponding window by manually operating the corresponding window open switch, thereby escaping from the submerged automobile through the opened window.

Thus, the proposed waterproof power window apparatus is very effective in that, when the automobile equipped with this apparatus is submerged, the driver or a passenger can manually operate the corresponding window open switch and escape from the automobile through the opened window. However, with the proposed apparatus, when the window open switch corresponding to a passenger seat is operated from the driver seat window operation unit, the corresponding passenger side window sometimes fails to open.

To be more specific, when the window open switch corresponding to a passenger seat window, for example the front passenger seat window, in the window operation unit for the driver seat window is operated, a signal indicative of this operation is transmitted from the CPU of the driver seat window operation unit to the CPU of the window operation unit on the front passenger seat through a bus line. Receiving this signal, the CPU of the window operation unit on the front passenger seat controls the motor driver of that window operation unit, thereby opening the window on the front passenger seat. In this case, although the motor driver in the window operation unit on the driver seat is waterproof, the signal transmission system including the bus line is affected by flooding. Therefore, the window open switch operation signal is not always transmitted without failure to the window operation unit on the front passenger seat for example.

It is therefore an object of the present invention to provide a power window apparatus for use on an automobile for opening any of its window without failure when the corresponding window open switch is manually operated on the window operation unit of the driver seat upon detection of flooding inside the automobile.

In carrying out the invention and according to one aspect thereof, there is provided power window apparatus for use on an automobile, comprising a driver seat window operation unit and a passenger seat window operation unit each having at least a window open switch, a window close switch, a motor for opening and closing a window, and a motor rotationally driver, the driver seat window operation unit having a submersion detector for generating a submersion detection signal when the automobile is submerged and a control driver for rotationally driving the motor so as to open a: corresponding window when the submersion detection signal is supplied to the motor rotationally driver and then the window open switch is manually operated, the power window apparatus having a connection line for connecting normally close contacts of the window open switch for the passenger seat window located on the driver seat window operation unit with normally close contacts of the window open switch located on the passenger seat window operation unit.

According to this novel constitution, if the submersion detector in the driver seat window operation unit detects the flooding inside the automobile and generates a submersion detection signal, it is transmitted to the drive controller in the driver seat window operation unit. Then, when the driver operates the window open switch for the driver seat window and/or any of the window open switches for the passenger seat windows both located on the driver seat window operation unit, the window corresponding to the operated window open switch opens immediately without failure.

In a preferred embodiment of the invention, the power window apparatus comprises a driver seat window operation unit and passenger seat window operation units each having at least a manually operated window open switch, a manually operated window close switch, a motor for opening or closing the window, and motor driver for driving the motor in the window open or close direction according to the operation of the window open switch or the window close switch. The driver seat window operation unit further has a submersion detector for generating a submersion detection signal when the automobile is submerged and a control driver for driving the motor so as to open the window when the submersion detection signal is supplied to the motor driver and then the window open switch is manually operated. This power window apparatus further has connection lines for connecting normally closed contacts of each of passenger seat window open switches located on the driver seat window operation unit with normally closed contacts of a window open switch located on a corresponding passenger seat window operation unit.

In another embodiment of the invention, the submersion detector of the power window apparatus is provided in at least one of the passenger seat window operation units.

According to the embodiments of the invention, when the submersion detector located on the driver seat window operation unit generates a submersion detection signal after submersion of the automobile for some reason and ensuing flooding inside the automobile, the signal is supplied to the drive controller of the driver seat window operation unit. When the driver operates the driver seat window open switch located on the driver seat window operation unit with the submersion detection signal supplied, the window of the driver seat opens. When the driver operates a passenger seat window open switch located on the driver seat window operation unit with the submersion detection signal supplied, the corresponding passenger seat window opens. Consequently, the driver as well as passengers can escape from the submerged automobile through the opened windows.

Furthermore, a window open signal based on a direct current is transmitted from the driver seat window operation unit to each passenger seat window operation unit through the connection lines, thereby making the power window apparatus simple in configuration and reliable in operation.

According to another embodiment of the invention, the driver can open the passenger seat window by operating the passenger seat window open switch on the driver seat window operation unit when the passenger seat operation unit is flooded before the driver seat operation unit is flooded.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

This invention will be described in further detail by way of example with reference to the accompanying drawings.

Figure 1:
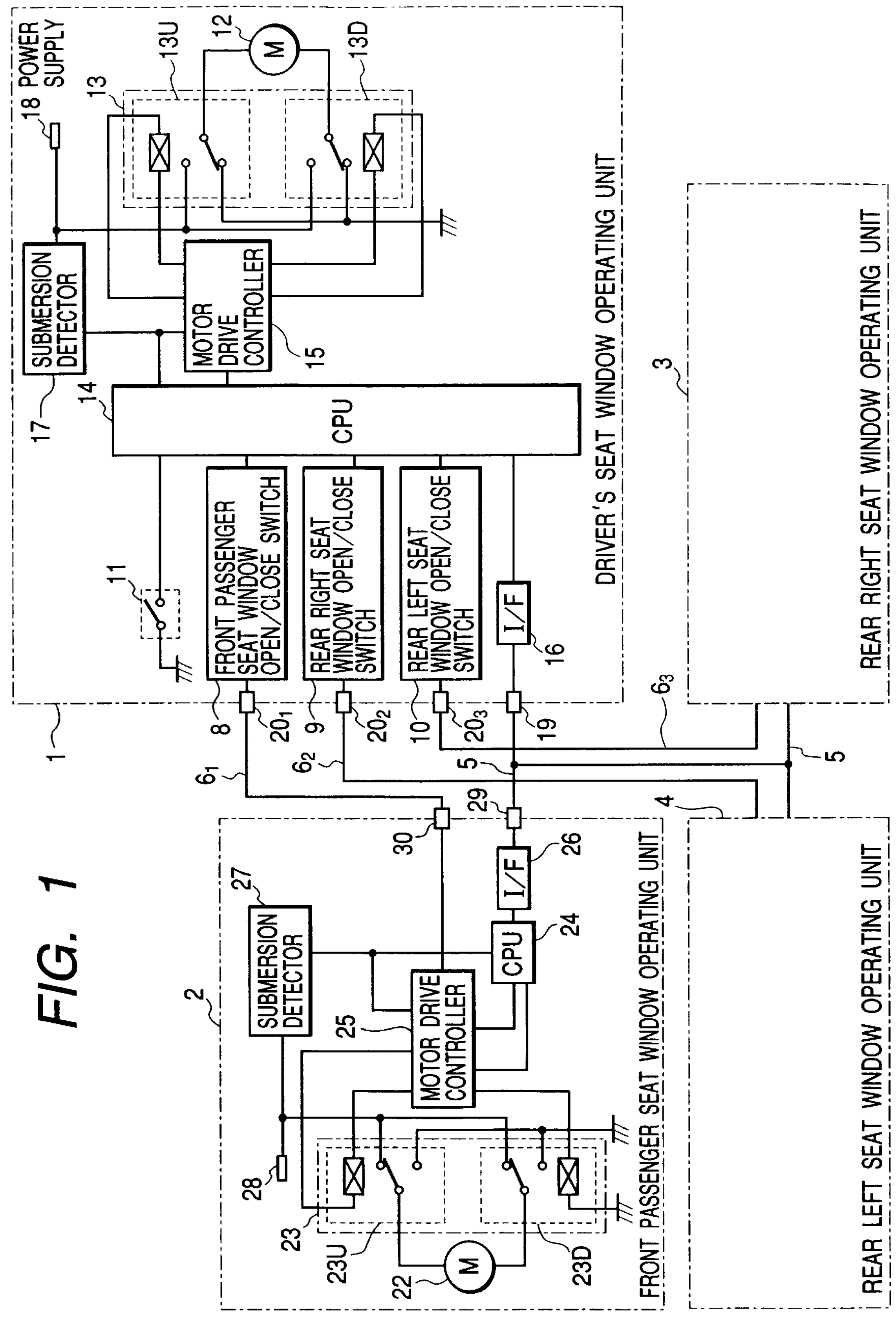
FIG. 1 is a circuit diagram illustrating a configuration of the main portion of a power window apparatus practiced as one embodiment of the invention.
Figure 2:
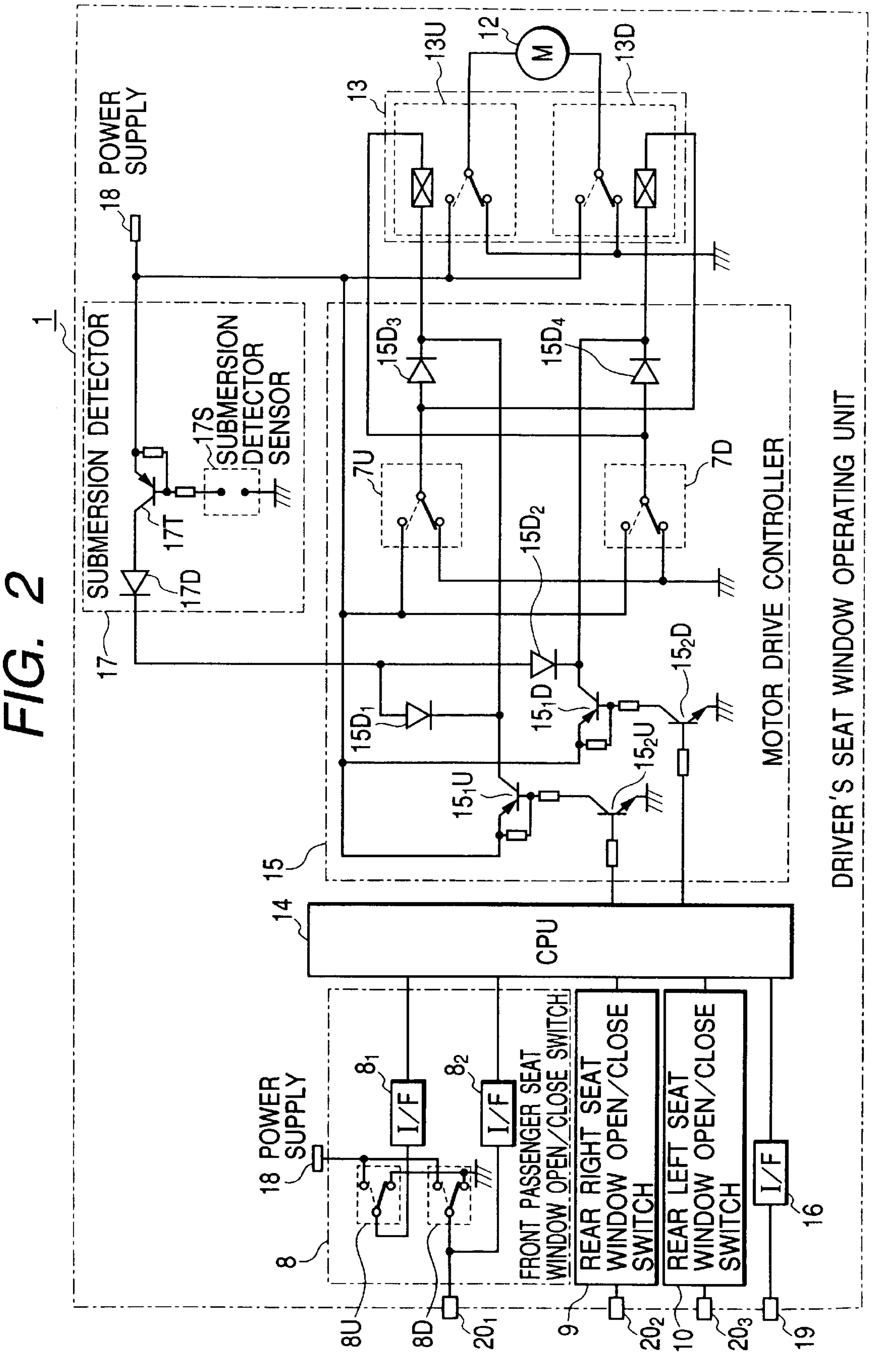
FIG. 2 is a circuit diagram illustrating a detail configuration of a driver seat window operation unit of the power window apparatus shown in FIG. 1.
Figure 3:
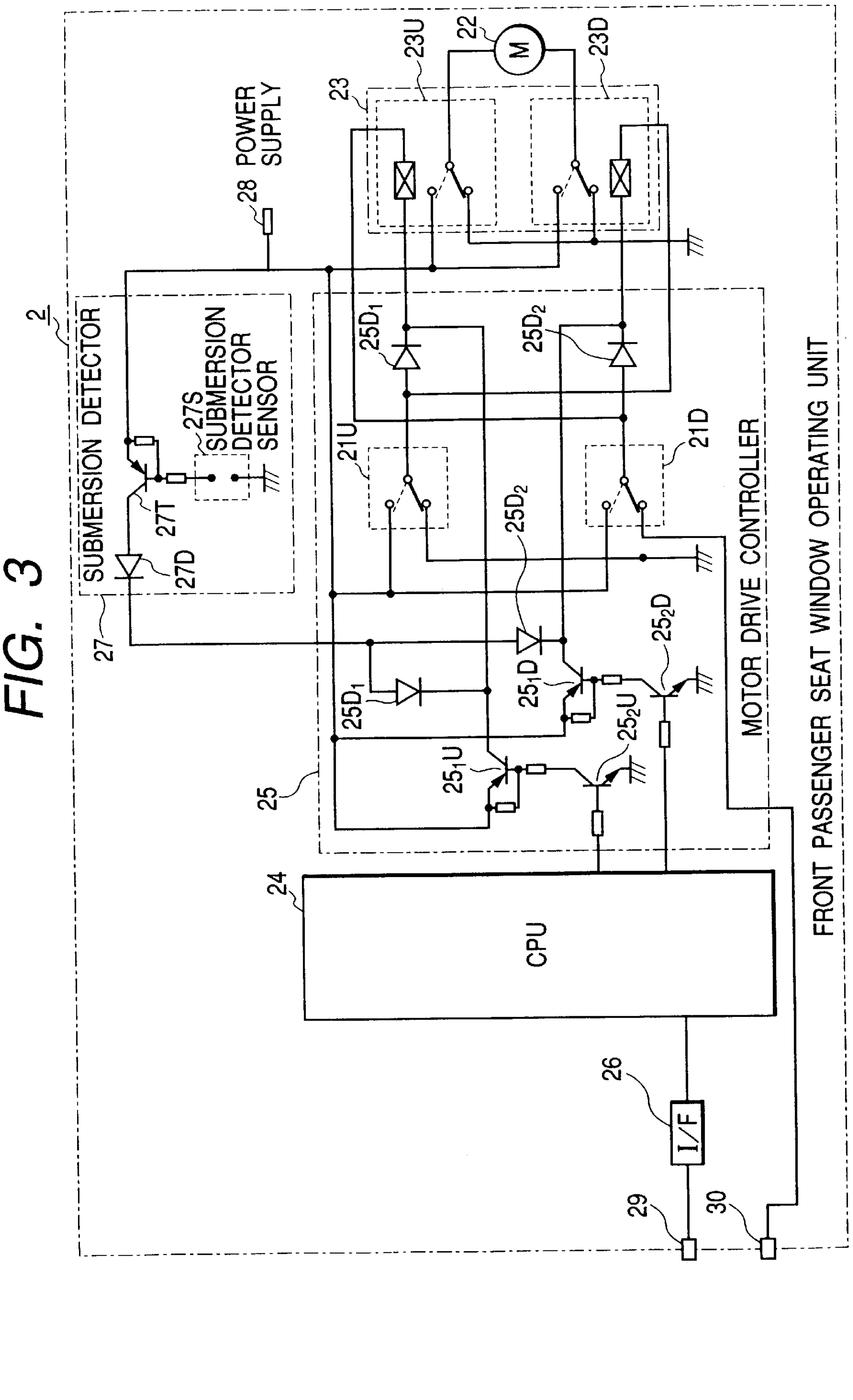
FIG. 3 is a circuit diagram illustrating a detail configuration of a front passenger seat window operation unit of the power window apparatus shown in FIG. 1.

Referring to FIG. 1, there is shown a configuration of the main portion of a power window apparatus practiced as one embodiment of the invention. Referring to FIG. 2, there is shown a detail configuration of a driver seat window operation unit of the power window apparatus shown in FIG. 1. Referring to FIG. 3, there is shown a detail configuration of a front passenger seat window operation unit of the power window apparatus shown in FIG. 1.

As shown in FIG. 1, the power window apparatus of this embodiment comprises a driver seat window operation unit 1, a front passenger seat window operation unit 2, a rear right seat window operation unit 3, a rear left seat window operation unit 4, a bus line 5, and three transmission lines $\mathbf{6}_1$, $\mathbf{6}_2$, an $\mathbf{6}_3$.

As shown in FIGS. 1 and 2, the driver seat window operation unit 1 comprises a driver seat window open switch 7D of 1-circuit 2-contact type, a driver seat window close switch 7U of 1-circuit 2-contact type, a front passenger seat window open/close switch 8, a rear right seat window open/close switch 9, a rear left seat window open/close switch 10, an auto switch 11, a window open/close motor 12, a motor rotational direction switching relay 13, a controller (CPU) 14, a motor drive controller 15, an interface (I/F) 16, a submersion detector 17, a power supply terminal 18, a bus line connector terminal 19, and three connection line terminals $\mathbf{20}_1$, $\mathbf{20}_2$, and $\mathbf{20}_3$.

In this example, the front passenger seat window open/close switch 8 comprises a front passenger seat window close switch 8U of 1-circuit 2-contact type, a front passenger seat window open switch 8D of 1-circuit 2-contact type, and two interfaces (I/f) $\mathbf{8}_1$ and $\mathbf{8}_2$. The rear right seat window open/close switch 9 and the rear left seat window open/close switch 10 have each the same configuration, although not shown in FIG. 2, as the front passenger seat window open/close switch. The motor rotational direction switching relay 13 comprises a window close relay 13U of 1-circuit 2-contact type and a window open relay 13D of 1-circuit 2-contact type. The motor drive controller 15 comprises transistors $\mathbf{15}_1$U, $\mathbf{15}_2$U for driving the window close relay 13U, transistors $\mathbf{15}_1$D and $\mathbf{15}_2$D for driving the window open relay 13D, and four buffer diodes 15$D_1$, 15$D_2$, 15$D_3$, and 15$D_4$. The submersion detector 17 comprises a submersion detector sensor 17S, a submersion detector transistor 17T, and one buffer diode 17D. The components 7D, 7U, 8 through 19, and $\mathbf{20}_1$ through $\mathbf{20}_3$ of the driver seat window operation unit are interconnected as shown in FIGS. 1 and 2.

As shown in FIGS. 1 and 3, the front passenger seat window operation unit 2 comprises a front passenger seat window close switch 21U of 1-circuit 2-contact type, a front passenger seat window open switch 21D of 1-circuit 2-contact type, a window open/close motor 22, a motor rotational direction switching relay 23, a controller (CPU) 24, a motor drive controller 25, an interface (I/F) 26, a submersion detector 27, a power supply terminal 28, a bus line connector terminal 29, and a connection line terminal 30.

In this example, the motor rotational direction switching relay 23 comprises a window close relay 23U of 1-circuit and 2-contact type and a window open relay 23D of 1-circuit 2-contact type. The motor drive controller 25 comprises transistors $\mathbf{25}_1$U and $\mathbf{25}_2$U for driving the window close relay 23U, transistors $\mathbf{25}_1$D and $\mathbf{25}_2$D for driving the window open relay 23D, and two buffer diodes 25$D_1$ and 25$D_2$. The submersion detector 27 comprises a submersion detector sensor 27S, a submersion detector transistor 27T, and one buffer diode 27D. The components 21D, 21U, 22 through 30 of the front passenger seat window operation unit are interconnected as shown in FIG. 1 and 3.

It should be understood that, although not specifically shown in FIG. 1, the rear right seat window operation unit 3 and the rear left seat window operation unit 4 have each the same circuit configuration as that of the front passenger seat window operation unit shown in FIG. 3.

The bus line 5, as shown in FIG. 1, is connected between the bus line connection terminal 19 of the driver seat window operation unit 1, the bus line connection terminal 29 of the front passenger seat window operation unit 2, the bus line connection terminal (not shown) of the rear right seat window operation unit 3, and the bus line connection terminal (not shown) of the rear left seat window operation unit 4. The connection line $\mathbf{6}_1$ is connected between the connection line terminal $\mathbf{20}_1$ of the driver seat window operation unit 1 and the connection line terminal 30 of the front passenger seat window operation unit 2. The connection line $\mathbf{6}_2$ is connected between the connection line terminal $\mathbf{20}_2$ of the driver seat window operation unit 1 and the connection line terminal (not shown) of the rear right seat window operation unit 3. The connection line $\mathbf{6}_3$ is connected between the connection line terminal $\mathbf{20}_3$ of the driver seat window operation unit 1 and the connection line terminal (not shown) of the rear left seat window operation unit 4.

The power window apparatus of this embodiment having the above-mentioned configuration operates as follows.

First, the operation of the power window apparatus to be executed when the automobile is in the normal state (that is, not in the submerged state) will be described.

When the driver operates the driver seat window close switch 7U of the driver seat window operation unit 1, the contacts of the driver seat window close switch 7U are switched from a state represented by solid line to a state represented by dashed line as shown in FIG. 2. Then, a positive voltage supplied to the power supply terminal 18 is supplied to the window close relay 13U of the motor rotational direction switching relay 13 through the switched driver seat window close switch 7U and the buffer diode 15$D_3$, thereby switching the contacts of the window close relay 13U from a state represented by solid line to a state represented by dashed line. At this moment, the positive voltage at the power supply terminal 18 is supplied to the window open/close motor 12 through the contacts of the switched window close relay 13U, upon which the window open/close motor 12 rotates in the direction of closing the driver seat window connected to the motor 12.

On the other hand, when the driver manually operates the driver seat window open switch 7D of the driver seat window operation unit 1, the contacts of the driver seat window open switch 7D are switched from a state represented by solid line to a state represented by dashed line to supply the positive voltage from the power supply terminal 18 to the window open relay 13D of the motor rotational direction switching relay 13 through the switched driver seat window open switch 7D and the buffer diode 15$D_4$, thereby switching the contacts of the window open relay 13D from a state represented by solid line to a state represented by dashed line as shown in FIG. 2. At this moment, the positive voltage at the power supply terminal 18 is supplied to the window open/close motor 12 through the switched contacts of the window open relay 13D to rotate the window open/close motor 12 in the direction of opening the driver seat window.

When the driver manually operates the front passenger seat window close switch 8U of the front passenger seat window open/close switch 8 located on the driver seat window operation unit 1, thereby switching the contacts of the switch 8U from a state represented by solid line to a state represented by dashed line as shown in FIG. 2, the controller 14 senses this contact switching through the interface $\mathbf{8}_1$, thereby generating a first control information signal for closing the front passenger side window. The first control information signal is transmitted from the controller 14 to the front passenger seat window operation unit 2 through the interface 16, the bus line connection terminal 19, and the bus line 5. Receiving the first control information signal at the bus line connection terminal 29, the front passenger a seat window operation unit 2 supplies the received signal to the controller 24 through the interface 26. In response to the first control information signal, the controller 24 supplies a drive signal to the transistor $\mathbf{25}_2$U to make the same conduct, which in turn makes the transistor $\mathbf{25}_1$U conduct. The positive voltage at the power supply voltage 28 is supplied to the window close relay 23U of the motor rotational direction switching relay 23 through the conducting transistor $\mathbf{25}_1$U, thereby switching the contacts of the window close relay 23U from a state represented by solid line to a state represented by dashed line as shown in FIG. 3. At this moment, the positive voltage at the power supply terminal 28 is supplied to the window open/close motor 22 through the switched contacts of the window close relay 23U, thereby rotating the window open/close motor 22 in one direction to close the front passenger seat window.

On the other hand, when the driver manually operates the front passenger seat window open switch 8D of the front passenger seat window open/close switch 8 located on the driver seat window operation unit 1 to switch the contacts of the switch 8D from a state represented by solid line to a state represented by dashed line as shown in FIG. 2, the positive voltage at the power supply terminal 18 is applied to the normally close contacts of the front passenger seat window open switch 21D through the switched passenger seat window open switch 8D, the bus line connection terminal $\mathbf{20}_1$, the connection line $\mathbf{6}_1$, and the bus line connection terminal 30 of the front passenger seat window operation unit 2, driving the window open relay 23D through the buffer diode $\mathbf{25}D_2$. At the same time, the controller 14 senses this contact switching of the passenger seat window open switch 8D through the interface $\mathbf{8}_2$, generating a second control information signal. The second control information signal is transmitted from the controller 14 to the front passenger seat window operation unit 2 through the interface 16, the bus line connection terminal 19, and the bus line 5. Receiving the second control information signal at the bus line connection terminal 29, the front passenger seat window operation unit 2 supplies this signal to the controller 24 through the interface 26. In response to the supplied signal, the controller 24 senses the operation of the front passenger seat window open switch 8D of the driver seat window operation unit 1, thereby assuming that the front passenger seat window has opened.

Further, when the driver manually operates the rear right seat window close switch (not shown) of the rear right seat window open/close switch 9 located on the driver seat window operation unit 1 to switch the contacts of the window close switch, the controller 14 generates a third control information signal for closing the rear right seat window. The third control information signal is supplied to the rear right passenger side window operation unit 3 through the bus line 5. In response to the supplied signal, the rear right seat window operation unit 3 operates to close the rear right seat window in generally the same sequence as when the front passenger seat window is closed by operating the front passenger seat window operation unit 2.

On the other hand, when the driver manually operates the rear right seat window open switch (not shown) of the rear right seat window open/close switch 9 located on the driver seat window operation unit 1 to switch the contacts of this window open switch, the positive voltage at the power supply terminal 18 is applied to the normally close contacts (not shown) of the rear right seat window open switch of the rear right seat window operation unit 3 through the switched rear right seat window open switch, the bus line connection terminal $\mathbf{20}_2$, the connection line $\mathbf{6}_2$, and the bus line connection terminal (not shown) of the rear right seat window operation unit 3, thereby opening the rear right seat window in generally the same sequence as when the front passenger seat window is opened by operating the front passenger seat window operation unit 2.

When the driver manually operates the rear left seat window open/close switch 10 located on the driver seat window operation unit 1, the rear left seat window is opened or closed in generally the same sequence as when the rear right seat window open/close switch 9 is operated.

When the front passenger manually operates the front passenger seat window close switch 21U located on the front passenger seat window operation unit 2, the contacts of the front passenger seat window close switch 21U are switched from a state represented by solid line to a state represented by dashed line as shown in FIG. 3. The positive voltage at the power supply terminal 27 is supplied to the window close relay 23U of the motor rotational direction switching relay 23 through the switched front passenger seat window close switch 21U and the buffer diode $\mathbf{25}D_1$, thereby switching the contacts of the window close relay 23U from a state represented by solid line to a state represented by dashed line as shown in FIG. 3. At this moment, the positive voltage at the power supply terminal 28 is supplied to the window open/close motor 22 through the switched contacts of the window close relay 21U, upon which the window open/close motor 22 rotates in one direction to close the front passenger seat window.

On the other hand, when the front passenger manually operates the front passenger seat window open switch 21D located on the front passenger seat window operation unit 2, the contacts of the front passenger seat window open switch 21D are switched from a state represented by solid line to a state represented by dashed line as shown in FIG. 3. The positive voltage at the power supply terminal 28 is supplied to the window open re lay 23D of the motor rotational direction switching relay 23 through the switched front passenger seat window open switch 21D and the buffer diode $\mathbf{25}D_2$, thereby switching the contacts of the window open relay 23D from a state represented by solid line to a state represented by dashed line as shown in FIG. 3. At this moment, the positive voltage at the power supply terminal 28 is supplied to the window open/close motor 22 through the switched window open relay 21D, upon which the window open/close motor rotates in the direction of opening the front passenger seat window.

Although not shown in FIG. 1, when the rear right passenger manually operates the rear right seat window close switch located on the rear right seat window operation unit 3 or the rear left passenger manually operates the rear left seat window close switch located on the rear left seat window operation unit 4, the rear right side window or the rear left side window is closed in generally the same sequence as when the front passenger operates the front passenger seat window close switch 21U located on the front passenger seat window operation unit 2.

Likewise, although not shown in FIG. 1, when the rear right passenger manually operates the rear right seat window open switch located on the rear right seat window operation unit 3 or the rear left passenger manually operates the rear left seat window open switch located on the rear left seat window operation unit 4, the rear right seat window or the rear left seat window is opened in generally the same sequence as when the front passenger manually operates the front passenger seat window open switch 21D located on the front passenger seat window operation unit 2.

It should be understood that, when the automobile is in the normal state (namely, it is not in the submerged state), the submersion detector sensor 17S of the submersion detector 17 of the driver seat window operation unit 1 does not detect submersion and a terminal-to-terminal resistance of the submersion detector sensor 17S is large enough to put the submersion detection transistor 17T in a nonconducting state. Therefore, no submersion detection signal is outputted from the submersion detector 17.

The following describes the operation of the power window apparatus of the present embodiment to be executed when the automobile has been submerged for some reason and the automobile is flooded inside.

When flooding begins inside the automobile, the driver seat door pocket, the front passenger seat door pocket, the rear right seat door pocket, and the rear left seat door pocket are also flooded to put the driver seat window operation unit 1, the front passenger seat window operation unit 2, the rear right seat window operation unit 3, and the rear left seat window operation unit 4 into the flooded state.

When the submersion detector sensor 17S exposed from the submersion detector 17 of the driver seat window operation unit 1 detects flooding soon after the flooding inside the automobile, the submersion detector 17 outputs a submersion detection signal. To be more specific, when the water gets between a pair of conductors of the submersion detector sensor 17S, the resistance between these conductors lowers to make lower the base circuit in a direct current manner of the submersion detection transistor 17T, thereby making the same conduct, upon which a submersion detection signal based on a direct-current voltage value approximate to the supply voltage at the power supply terminal 18 is outputted from the submersion detector 17. Then, the outputted submersion detection signal is supplied to the motor drive controller 15 of the driver seat window operation unit 1.

The submersion detection signal supplied to the motor drive controller 15 is then supplied to the window open relay 13D and the window close relay 13U of the motor rotational direction switching relay 13 through the buffer diodes $\mathbf{15D_1}$ and $\mathbf{15D_2}$, thereby switching the contacts of the window open relay 13D from a state represented by solid line to a state represented by dashed line as shown in FIG. 2 and contacts of the window close relay 13U from a state represented by solid line to a state represented by dashed line as shown in FIG. 2. At this moment, the supply voltage is applied from the power supply terminal 18 between both the ends of the window open/close motor 12, so that the window open/close motor 5 does not rotate in either direction. Consequently, the driver seat window is neither opened nor closed.

This state is maintained almost steadily when the water gets inside the driver seat window open switch 7D and the driver seat window close switch 7U, thereby making the portion enclosed by dashed lines shown in FIG. 2 lose insulation or a local electrical short circuit occurs in some other circuit portions.

When the driver manually operates the driver seat window open switch 7D located on the driver seat window operation unit 1, the contacts of the switch 7D are switched from a state represented by solid line to a state represented by dashed line as shown in FIG. 2, supplying the positive voltage from the power supply terminal 18 to both ends of the window close relay 13U. At this moment, the operation of the window close relay 13U is stopped, the contact thereof being restored from the state represented by dashed line to the state represented by solid line, upon which the contact-side terminal of the window close relay 13U of the window open/close motor 12 is grounded. This applies the supply voltage from the power supply terminal 18 to both ends of the window open/close motor 12 through the contacts of the window open relay 13D, rotating the window open/close motor 12 in the direction of opening the driver seat window to open the driver seat window. This allows the driver to escape from the submerged automobile through the opened driver seat window.

Next, when the driver manually operates the front passenger seat window open switch 8D of the front passenger seat window open/close switch 8 located on the driver seat window operation unit 1, the contacts of the switch 8D are switched from the state represented by dashed line to the state represented by solid line as shown in FIG. 2 to output a front passenger seat window open signal based on the voltage supplied from the power supply terminal 18 to the connection line $\mathbf{6_1}$ of the connection line terminal $\mathbf{20_1}$, the signal being transmitted to the front passenger seat window operation unit 2 through the connection line $\mathbf{6_1}$.

Receiving the front passenger seat open signal through the connection line $\mathbf{6_1}$, the front passenger seat window operation unit 2 supplies this signal to the normally close contacts of the front passenger seat window open switch 21D. At this moment, the front passenger seat window open signal is supplied to the window open relay 23D through the contacts switched to the state represented by solid line as shown in FIG. 3, thereby switching these contacts from the state represented by solid line to the state represented by dashed line as shown in FIG. 3. This supplies the supply voltage from the power supply terminal 27 to both ends of the window open/close motor 22 through the contacts of the window open relay 23D, thereby rotating the window open/close motor 22 in the direction of opening the front passenger seat window. This allows the front passenger to escape from the submerged automobile through the opened front passenger seat window.

If the front passenger seat window operation unit 2 is flooded before the driver manually operates the front passenger seat window open/close switch 8 located on the driver seat window operation unit 1, the submersion detector 27 senses the flooding and outputs a submersion detection signal to the motor drive controller 25, thereby providing anti-submersion measures on the front passenger seat window operation unit 2. Namely, the application of water between the pair of submersion detection conductors of the submersion detector sensor 27S exposed from the submersion detector 27 reduces the resistance between the pair of submersion detection conductors, which in turn linearly reduces the resistance of the base circuit of the submersion detection transistor 27T to make the same conduct, thereby outputting from the submersion detector 27 a submersion detection signal generally equal to the supply voltage at the power supply terminal 28 to the motor drive controller 25.

The submersion detection signal supplied to the motor drive controller 25 is supplied to the window open relay 23D and the window close relay 23U of the motor rotational direction switching relay 23 through the buffer diodes $\mathbf{25D_1}$ and $\mathbf{25D_2}$, simultaneously switching the contacts of the window open relay 23D and the contacts of the window close relay 23U from the state represented by solid line to the state represented by dashed line as shown in FIG. 2. This arrangement also provides anti-submersion measures for the front passenger seat window operation unit 2.

When, in this state, the driver manually operates the front passenger seat window open switch 8D of the front passenger seat window open/close switch 8 located on the driver seat window operation unit 1, a front passenger seat window open signal is supplied to the front passenger seat window operation unit 2 through the connection line $\mathbf{6_1}$. This signal is then supplied to the normally close contacts of the front passenger seat window open switch 21D and then to the normally close contacts of the window close relay 23U and the window open relay 23D. Consequently, the supply voltage is applied to both ends of the window close relay 23U to stop the operation of the window close relay 23U while the operation of the window open relay 23D continues operating, thereby rotating the window open/close motor in the direction of opening the front passenger seat window.

Next, when the driver manually operates the rear right seat window open switch (not shown) of the rear right seat window open/close switch 9 located on the driver seat window operation unit 1 to switch the contacts of this window open switch, a rear right seat window open signal based on the supply voltage from the power supply terminal 18 is outputted to the connection line terminal $\mathbf{20}_2$, the signal being further transmitted to the rear right seat window operation unit 3 through the connection line $\mathbf{6}_2$. In this case, the operation to be executed in the rear right seat window operation unit 3 is generally the same as that in the front passenger seat window operation unit 2 and therefore the description will be skipped.

Then, when the driver manually operates the rear left seat window open switch (not shown) of the rear left seat window open/close switch 9 located on the driver seat window operation unit 1 to switch the contacts of this window open switch, a rear left seat window open signal based on the supply voltage from the power supply terminal 18 is outputted to the connection line terminal $\mathbf{20}_3$, the signal being further transmitted to the rear left seat window operation unit 4 through the connection line $\mathbf{6}_3$. In this case, the operation to be executed in the rear right seat window operation unit 4 is generally the same as that in the front passenger seat window operation unit 2 and therefore the description will be skipped.

Thus, according to the power window apparatus of the present embodiment, when, upon flooding inside the automobile, the submersion detector sensor 17S of the submersion detector 17 in the driver seat window operation unit 1 senses the flooding and the submersion detector 17 outputs a submersion detection signal, this signal is supplied to the motor drive controller 15 in the driver seat window operation unit 1. When, in this state, the driver manually operates the driver seat window open switch 7D, the driver seat window can be opened. Likewise, when the driver manually operates the window open switch 8D of the front passenger seat window open/close switch 8, the window open switch of the rear right seat window open/close switch 9, and the window open switch of the rear left seat window open/close switch 10 located on the driver seat window operation unit 1, the front passenger seat window, the rear right seat window, and the rear left seat window can be opened. Passengers can then escape from the submerged automobile through the opened windows respectively.

Furthermore, according to the power window apparatus of the present embodiment, the front passenger seat window open signal, the rear right seat window open signal, and rear left seat window open signal are supplied in the form of direct current electrical signals from the driver seat window operation unit 1 to the front passenger seat window operation unit 2, the rear right seat window operation unit 3, and the rear left seat window operation unit 4 through the connection lines $\mathbf{6}_1$, $\mathbf{6}_2$, and $\mathbf{6}_3$ respectively. This arrangement simplifies the configuration of the apparatus and enhances its operational reliability.

The description of the above-mentioned embodiment has been made by use of an example in which the submersion detectors 17 and 27 are located on the driver seat window operation unit 1 and the front passenger seat window operation unit 2. It will be apparent to those skilled in the art that the submersion detectors according to the invention may also be provided in one or more of the passenger seat window operation units other than the driver seat window operation unit 1 as required.

In addition, the description of the above-mentioned embodiment has been made by use of an example in which a pair of flat submersion detection conductors as shown in FIG. 2 are used as the submersion detection sensor 17S for use in the submersion detector 17. It will be apparent to those skilled in the art that another type of submersion detection conductors may be used. For example, plural pairs of flat conductors connected in parallel, a pair of opposed pin-shaped conductors, a pair of opposed pin-shaped conductors connected in parallel, a pair of bent pin-shaped conductors whose tip are opposed to each other, or a pair of bent pin-shaped conductors whose tip are opposed to each other connected in parallel.

As described and according to the invention, when an automobile has been submerged and flooded inside, the submersion detector located on the driver seat window operation unit senses the flooding and supplies a submersion detection signal to the drive controller located on the driver seat window operation unit. When, in this state, the driver manually operates one or more window open switches located on the driver seat window operation unit, one or more corresponding windows are immediately opened, through which the driver and/or one or more passengers can escape from the submerged automobile.

Furthermore, the window open signals based on a direct current voltage are transmitted from the driver seat window operation unit to the passenger seat window operation units through connection lines, thereby simplifying the configuration of the power window apparatus and enhances its operational reliability.

While the preferred embodiments of the present invention have been described using specific terms, such description is for illustrative purposes only, and it is to be understood that changes and variations may be made without departing from the spirit or scope of the appended claims.

What is claimed is:

1. A power window apparatus for an automobile, comprising a driver seat window operation unit and a passenger seat window operation unit each having at least a manually operated window open switch, a manually operated window close switch, a motor for opening and closing a window, and a motor rotationally driving means for driving said motor in one of window close and window open directions in response to a manual operation of one of said window open switch and said window close switch, said driver seat window operation unit having submersion detecting means for generating a submersion detection signal when said automobile is submerged and control drive means for rotationally driving said motor so as to open a corresponding window when said submersion detection signal is supplied to said motor rotationally driving means and then said window open switch is manually operated, said power window apparatus having a connection line for connecting normally close contacts of said window open switch located on said driver seat window operation unit with normally close contacts of said window open switch located on said passenger seat window operation unit.

2. The power window apparatus according to claim 1, wherein a submersion detecting means is also provided on at least one of passenger seat window operation units.

* * * * *